(12) United States Patent
Yasuda

(10) Patent No.: US 11,374,460 B2
(45) Date of Patent: Jun. 28, 2022

(54) VEHICLE

(71) Applicant: HONDA MOTOR CO., LTD., Tokyo (JP)

(72) Inventor: Norifumi Yasuda, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 335 days.

(21) Appl. No.: 16/805,345

(22) Filed: Feb. 28, 2020

(65) Prior Publication Data
US 2020/0287443 A1 Sep. 10, 2020

(30) Foreign Application Priority Data
Mar. 6, 2019 (JP) .............................. JP2019-040769

(51) Int. Cl.
| | | |
|---|---|---|
| H02K 7/12 | (2006.01) | |
| H02K 7/00 | (2006.01) | |
| H02K 7/20 | (2006.01) | |
| B60K 1/00 | (2006.01) | |
| H02K 7/116 | (2006.01) | |

(52) U.S. Cl.
CPC .............. H02K 7/12 (2013.01); B60K 1/00 (2013.01); H02K 7/006 (2013.01); H02K 7/116 (2013.01); H02K 7/20 (2013.01); *B60Y 2400/60* (2013.01)

(58) Field of Classification Search
CPC . H02K 7/12; H02K 7/116; H02K 7/20; H02K 7/006
See application file for complete search history.

(56) References Cited

U.S. PATENT DOCUMENTS 6,166,498 A * 12/2000 Yamaguchi ........... B60L 15/007
  903/910
8,905,881 B2 * 12/2014 Sada ...................... B60K 6/445
  475/5

FOREIGN PATENT DOCUMENTS

| JP | 2007-022529 A | 2/2007 |
| JP | 2012-144227 A | 8/2012 |

(Continued)

OTHER PUBLICATIONS

Dec. 22, 2020, Japanese Office Action issued for related JP Application No. 2019-040769.

*Primary Examiner* — Dang D Le
(74) *Attorney, Agent, or Firm* — Paratus Law Group, PLLC

(57) ABSTRACT

A vehicle includes a first rotating electric machine, a second rotating electric machine, a power transmission device and an accommodation case. The rotating electric machine accommodation portion and the power transmission device accommodation portion are partitioned by a partition wall. The partition wall includes a first rotating electric machine accommodation wall, a second rotating electric machine accommodation wall, and a step wall which extends in the axial direction from the second rotating electric machine accommodation wall to the first rotating electric machine accommodation wall. The step wall is at least partially overlapped with the second rotating electric machine in the axial direction, and a distance between an outermost diameter portion of the second rotating electric machine and the step wall is shorter than a distance between the outermost diameter portion of the second rotating electric machine and an outermost diameter portion of the first rotating electric machine.

5 Claims, 4 Drawing Sheets

(56) References Cited

FOREIGN PATENT DOCUMENTS

| JP | 2013-060161 A | 4/2013 |
| JP | 2013-167296 A | 8/2013 |

\* cited by examiner

VEHICLE

CROSS-REFERENCE TO RELATED APPLICATIONS

This application is based on and claims priority under 35 USC 119 from Japanese Patent Application No. 2019-040769 filed on Mar. 6, 2019.

TECHNICAL FIELD

The present invention relates to a vehicle which can be driven by a rotating electric machine.

BACKGROUND ART

In recent years, vehicles which can be driven by a rotating electric machine, such as an electric vehicle and a hybrid vehicle, have been known. For example, JP-A-2013-167296 discloses a vehicle in which a first rotating electric machine, a second rotating electric machine, and a gear mechanism are accommodated in a case and can be driven by at least the second rotating electric machine.

However, in the vehicle of JP-A-2013-167296, when the vehicle collides from the front, the first rotating electric machine slides rearward and collides with the gear mechanism and the second rotating electric machine. Therefore, not only the first rotating electric machine but also the gear mechanism and the second rotating electric machine could be damaged.

SUMMARY OF INVENTION

An aspect of the invention provides a vehicle which can suppress damage to one rotating electric machine when a collision occurs from the other rotating electric machine side.

An embodiment of the present invention relates to a vehicle which includes a first rotating electric machine;

a second rotating electric machine which has a rotation axis parallel to a rotation axis of the first rotating electric machine and at least a part of which is arranged to overlap the first rotating electric machine in an axial direction;

a power transmission device which is arranged adjacent to the first rotating electric machine in the axial direction; and an accommodation case which has a rotating electric machine accommodation portion for accommodating the first rotating electric machine and the second rotating electric machine and a power transmission device accommodation portion for accommodating the power transmission device, in which the vehicle can be driven by at least the first rotating electric machine, the rotating electric machine accommodation portion and the power transmission device accommodation portion are adjacent to each other in the axial direction and are partitioned by a partition wall, the partition wall includes:
  a first rotating electric machine accommodation wall which faces the first rotating electric machine in the axial direction and to which the first rotating electric machine is fixed,
  a second rotating electric machine accommodation wall which is provided further on the power transmission device side in the axial direction than the first rotating electric machine accommodation wall and faces the second rotating electric machine in the axial direction and to which the second rotating electric machine is fixed, and
  a step wall which extends in the axial direction from the second rotating electric machine accommodation wall to the first rotating electric machine accommodation wall,
the step wall is at least partially overlapped with the second rotating electric machine in the axial direction, and
  a distance between an outermost diameter portion of the second rotating electric machine and the step wall is shorter than a distance between the outermost diameter portion of the second rotating electric machine and an outermost diameter portion of the first rotating electric machine According to the above embodiment of the present invention, when the vehicle collides from the second rotating electric machine side, the second rotating electric machine slides toward the first rotating electric machine side, but collides with the step wall of the partition wall before the first rotating electric machine. This can prevent the first rotating electric machine from being damaged when the vehicle collides from the second rotating electric machine side.

DESCRIPTION OF EMBODIMENTS

Hereinafter, an embodiment of a vehicle according to the invention will be described with reference to the accompanying drawings.

<Vehicle>

Figure 1:
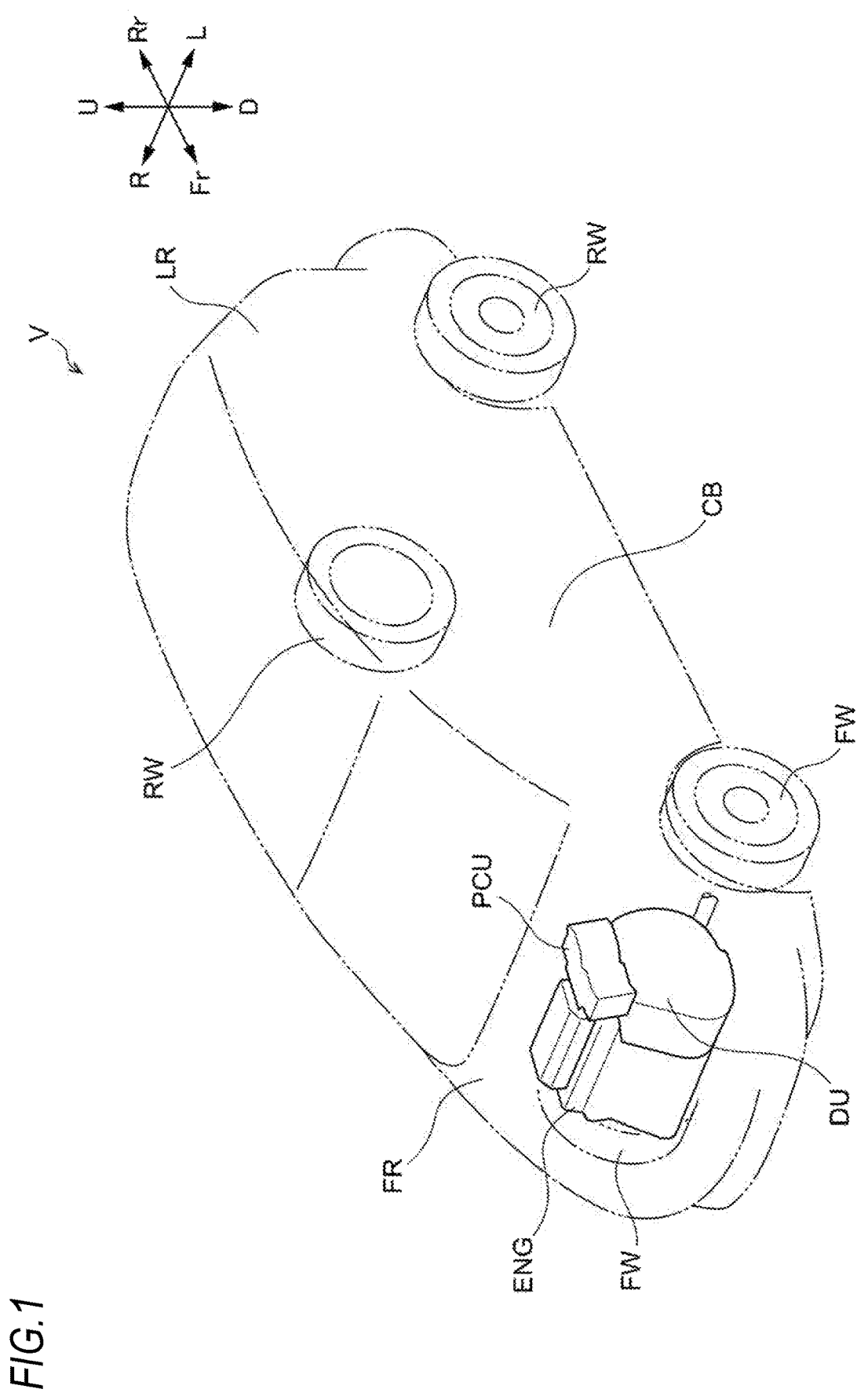
FIG. 1 is a perspective view of a vehicle according to a first embodiment of the invention as viewed obliquely from above.

As illustrated in FIG. 1, a vehicle V of the embodiment includes a cabin CB which is a living space of a passenger, a front room FR provided as a space separate from the cabin CB ahead of the cabin CB, and a luggage room LR provided as the same space as the cabin CB behind the cabin CB. The luggage room LR may be provided as a space separate from the cabin CB or a part thereof may be in communication.

The vehicle V is provided with a pair of front wheels FW in the front and a pair of rear wheels RW in the rear.

In this specification and the like, for simplicity and clarity of description, the front, rear, left, and right directions are defined according to the direction viewed from a driver of the vehicle V. In the drawing, according to the direction viewed from the driver, the front is indicated as Fr, the rear is indicated as Rr, the left is indicated as L, the right is indicated as R, the upper is indicated as U, and the lower is indicated as D. In this specification and the like, the left-right direction is also referred to as a vehicle width direction.

An engine ENG, a drive unit DU, and a power control unit PCU are mounted in the front room FR of the vehicle V.

The engine ENG and the drive unit DU are arranged adjacent to each other in the vehicle width direction in the front room FR. The power control unit PCU is connected between a battery (not illustrated) mounted on the vehicle V and the drive unit DU and converts a DC voltage into an AC voltage or an AC voltage into a DC voltage.

As described above, since the drive unit DU is disposed in the front room FR in front of the vehicle V, when the vehicle V collides from the front, the front of the front room FR may be crushed and the drive unit DU may be damaged.

<Drive Unit>

Figure 2:
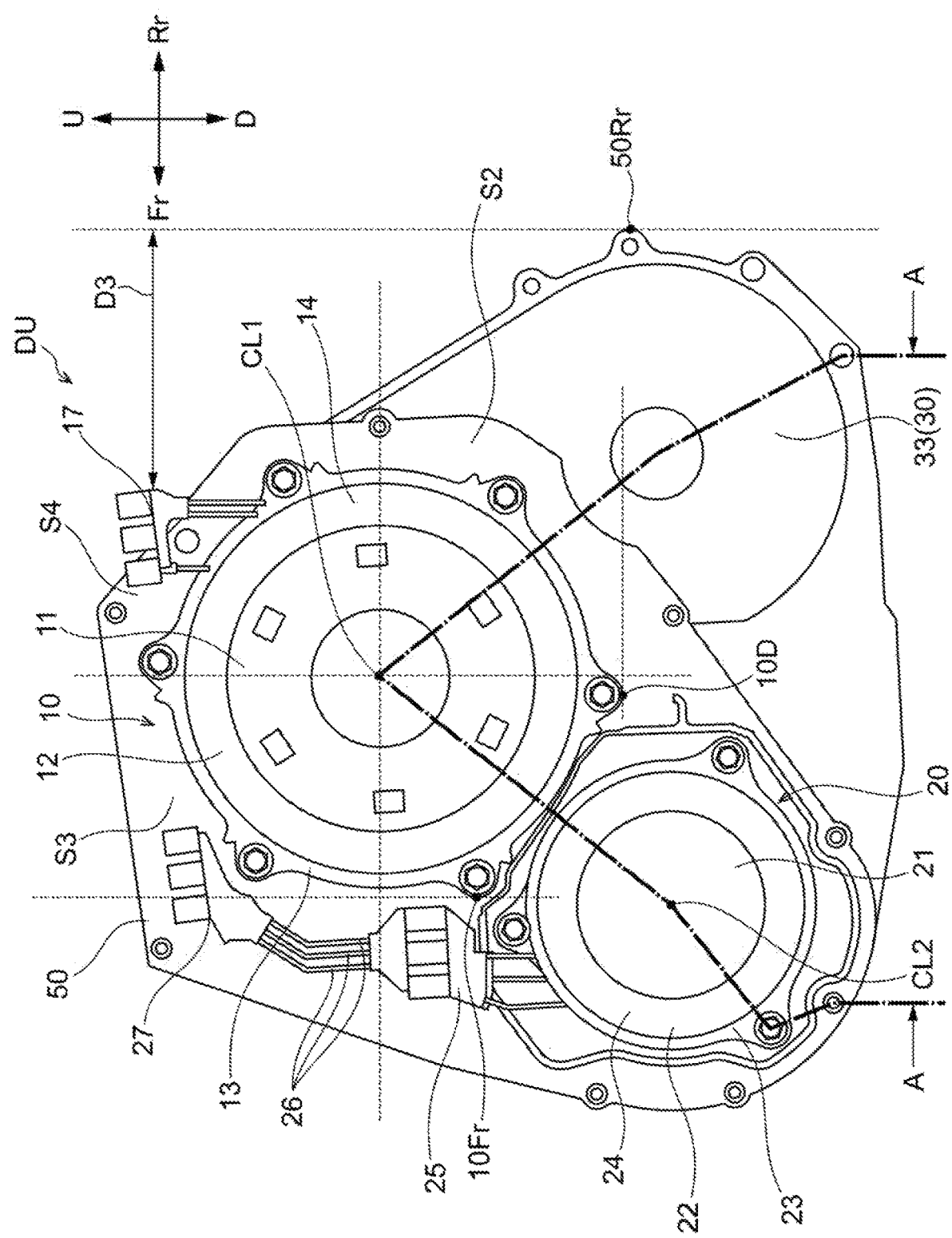
FIG. 2 is a view of the inside of a drive unit of the vehicle in FIG. 1 as viewed from the left.
Figure 3:
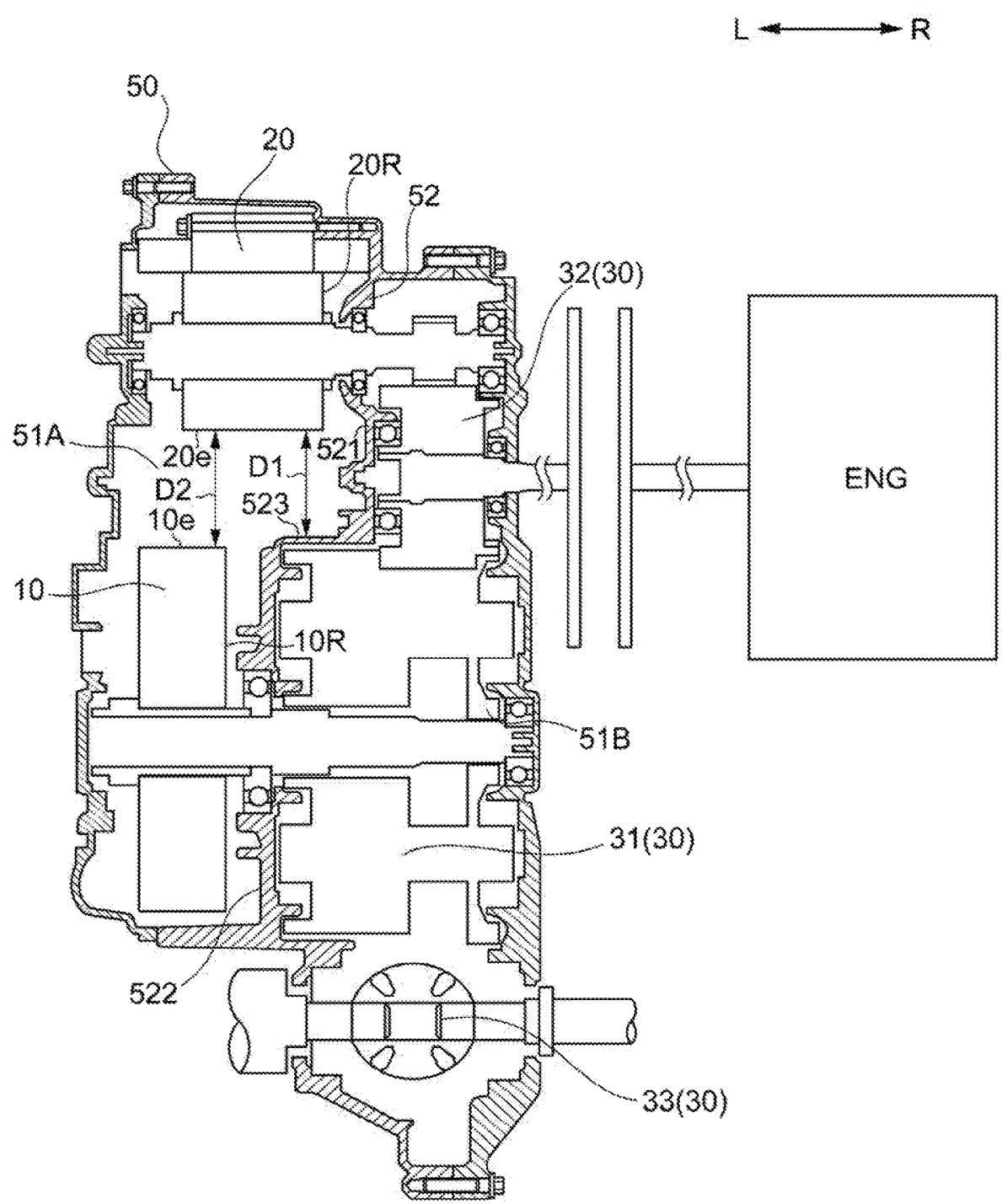
FIG. 3 is a cross-sectional view taken along a line A-A of FIG. 2.

As illustrated in FIGS. 2 and 3, the drive unit DU includes a first rotating electric machine 10, a second rotating electric machine 20, and a power transmission device 30. The first rotating electric machine 10, the second rotating electric machine 20, and the power transmission device 30 are accommodated in an accommodation case 50.

The power transmission device 30 includes a first power transmission device 31 for shifting the output from the first rotating electric machine 10, a second power transmission device 32 for shifting the output from the engine ENG and transmitting the output to the second rotating electric machine 20, and a differential device 33 for distributing power from the first power transmission device 31 to the pair of left and right front wheel FWs.

Therefore, the vehicle V can be driven by the power of the first rotating electric machine 10. For this reason, when the vehicle V collides from the front, even if the front of the front room FR is crushed and the drive unit DU is damaged, by suppressing damage to the first rotating electric machine 10, the vehicle V can be driven by the power of the first rotating electric machine 10.

In the embodiment, the power transmission device 30 is configured such that the first power transmission device 31 and the second power transmission device 32 can be connected and disconnected via a clutch mechanism (not illustrated). Therefore, it is also possible to directly transmit the output from the engine ENG to the front wheel FW via the second power transmission device 32, the first power transmission device 31, and the differential device 33.

Therefore, the vehicle V can be driven by the power of the engine ENG.

As illustrated in FIG. 2, a rotation axis CL1 of the first rotating electric machine 10 and a rotation axis CL2 of the second rotating electric machine 20 are arranged in parallel and both extend in the vehicle width direction (left-right direction).

In this specification, for simplicity of explanation, a direction parallel to the rotation axis CL1 of the first rotating electric machine 10 and the rotation axis CL2 of the second rotating electric machine 20, that is, the left-right direction (vehicle width direction) is also referred to as an axial direction.

The rotation axis CL1 of the first rotating electric machine 10 is disposed above and behind the rotation axis CL2 of the second rotating electric machine 20, when viewed from the axial direction. That is, the second rotating electric machine 20 is disposed below and in front of the first rotating electric machine 10.

As described above, by separately setting the rotation axis CL1 of the first rotating electric machine 10 and the rotation axis CL2 of the second rotating electric machine 20, the degree of freedom of the thickness dimension in the axial direction of the first rotating electric machine 10 and the second rotating electric machine 20 is improved. This makes it possible to increase the axial thickness of the first rotating electric machine 10 and the second rotating electric machine 20, and thus the output of the first rotating electric machine 10 and the second rotating electric machine 20 can be increased.

Parts of the first rotating electric machine 10 and the second rotating electric machine 20 are overlapped in an up-down direction and a front-rear direction when viewed from the axial direction. Thereby, the length dimension of the drive unit DU in the up-down direction and in the front-rear direction can be reduced, and thus downsizing can be achieved.

When viewed from the axial direction, the differential device 33 of the power transmission device 30 is located below and behind the first rotating electric machine 10, substantially at the same position in the up-down direction as the second rotating electric machine 20, and at a position spaced from the second rotating electric machine 20 by a predetermined distance.

The first rotating electric machine 10 includes a first rotor 11, a first stator core 13 surrounding the outer periphery of the first rotor 11, and a first stator 12 including a first coil 14 having three phases of U-phase, V-phase, and W-phase mounted on the first stator core 13.

The second rotating electric machine 20 includes a second rotor 21, a second stator core 23 surrounding the outer periphery of the second rotor 21, and a second stator 22 including a second coil 24 having three phases of U-phase, V-phase, and W-phase mounted on the second stator core 23.

As illustrated in FIG. 3, at least a part of the first rotating electric machine 10 and the second rotating electric machine 20 are arranged so as to overlap in the axial direction. A right end surface 20R of the second rotating electric machine 20 is disposed so as to be located further on the right side than a right end surface 10R of the first rotating electric machine 10.

The power transmission device 30 is disposed adjacent to the first rotating electric machine 10 and the second rotating electric machine 20 in the axial direction. The first power transmission device 31 is arranged on the right side of the second rotating electric machine 20 in the axial direction.

The accommodation case 50 includes a rotating electric machine accommodation portion 51A which accommodates the first rotating electric machine 10 and the second rotating electric machine 20 and a power transmission device accommodation portion 51B which accommodates the power transmission device 30. The rotating electric machine accommodation portion 51A and the power transmission device accommodation portion 51B are adjacent to each other in the axial direction and are partitioned by a partition wall 52.

The partition wall 52 includes a first rotating electric machine accommodation wall 521 which faces the first rotating electric machine 10 in the axial direction and to which the first rotating electric machine 10 is fixed, a second rotating electric machine accommodation wall 522 which is provided further on the right side in the axial direction than the first rotating electric machine accommodation wall 521 and faces the second rotating electric machine 20 in the axial direction and to which the second rotating electric machine 20 is fixed, and a step wall 523 which extends in the axial direction from the second rotating electric machine accommodation wall 522 to the first rotating electric machine accommodation wall 521.

The step wall 523 is at least partially overlapped with the second rotating electric machine 20 in the axial direction. A distance D1 between an outermost diameter portion 20e of the second rotating electric machine 20 and the step wall 523 is shorter than a distance D2 between the outermost diameter portion 20e of the second rotating electric machine and an outermost diameter portion 10e of the first rotating electric machine 10.

When the vehicle V collides from the front, the front of the front room FR of the vehicle V is crushed and the second rotating electric machine 20 slides rearward. In this case, the second rotating electric machine 20 collides with the step wall 523 of the partition wall 52 before the first rotating electric machine 10. When the second rotating electric machine 20 collides with the step wall 523, it is possible to suppress the second rotating electric machine 20 from colliding with the first rotating electric machine 10 and damage to the first rotating electric machine 10. Further, even when the second rotating electric machine 20 slides further rearward after colliding with the step wall 523 and collides with the first rotating electric machine 10, since the impact is absorbed by the step wall 523, the impact on the first rotating electric machine 10 can be reduced, and thus the damage of the first rotating electric machine 10 can be reduced. This can prevent the first rotating electric machine 10 from being damaged when the vehicle V collides from the front.

Figure 4:
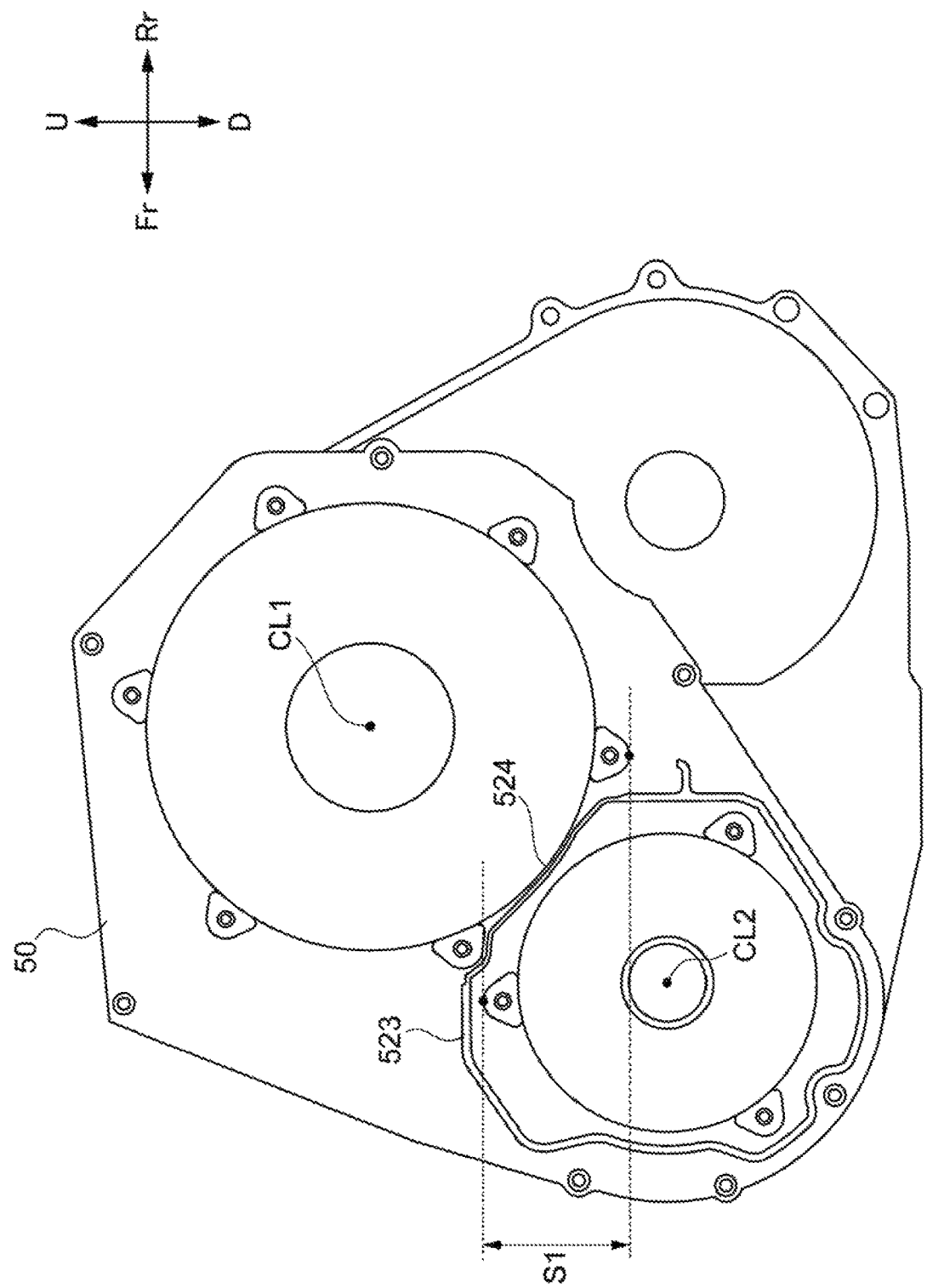
FIG. 4 is a view of an accommodation case of the drive unit of the vehicle in FIG. 1 as viewed from the left.

As illustrated in FIG. 4, when viewed from the axial direction, the step wall 523 of the partition wall 52 of the accommodation case 50 includes an inclined portion 524 which is inclined downward as it approaches the rotation axis CL1 of the first rotating electric machine 10 in the front-rear direction, that is, toward the rear. At least a part of the inclined portion 524 is disposed in an overlap region S1 where the first rotating electric machine 10 and the second rotating electric machine 20 overlap in the up-down direction.

Therefore, when the vehicle V collides from the front, the second rotating electric machine 20 slides rearward to collide with the inclined portion 524 of the step wall 523, and then slides downward along the inclined portion 524 toward the rear. Thereby, when the vehicle V collides from the front, since the second rotating electric machine 20 can be prevented from sliding in a direction approaching the first rotating electric machine 10 disposed on the upper and rear sides, damage to the first rotating electric machine 10 can be further suppressed. Furthermore, since the second rotating electric machine 20 can be prevented from sliding in a direction approaching the differential device 33 disposed rearward, damage to the differential device 33 can be suppressed.

Returning to FIG. 2, in the first coil 14 of each phase of the first rotating electric machine 10, one end is connected and the other end extends from the first stator core 13 and each of ends is connected to a first connection terminal portion 17.

When viewed from the axial direction, the first connection terminal portion 17 is disposed above a lower end portion 10D of the first rotating electric machine 10 in the up-down direction and in a region S2 behind the rotation axis CL1 of the first rotating electric machine 10 in the front-rear direction. Alternatively, the first connection terminal portion 17 is disposed above the rotation axis CL1 of the first rotating electric machine 10 in the up-down direction and in a region S3 behind a front end portion 10Fr of the first rotating electric machine 10 in the front-rear direction. In the embodiment, when viewed from the axial direction, the first connection terminal portion 17 is arranged radially outside the first rotating electric machine 10 and above the rotation axis CL1 of the first rotating electric machine 10 in the up-down direction and in a region S4 behind the rotation axis CL1 of the first rotating electric machine 10 in the front-rear direction. The region S4 is a region obliquely above and behind the rotation axis CL1 of the first rotating electric machine 10 and is a region where the region S2 and the region S3 overlap. In the embodiment, the first connection terminal portion 17 is arranged at the uppermost portion in the accommodation case 50 of the region S4.

The first connection terminal portion 17 is connected to a first connection member (not illustrated) such as a bus bar, which is arranged above the accommodation case 50 and is electrically connected to a power conversion device (not illustrated) in the power control unit PCU. As a result, the first rotating electric machine 10 can be controlled by the power control unit PCU.

When the vehicle V collides from the front, the front of the front room FR of the vehicle V is crushed and the front of the accommodation case 50 is crushed. In this case, since the first connection terminal portion 17 is arranged in the region S2 or the region S3, even when the front of the accommodation case 50 is crushed, the first stator core 13 of the first rotating electric machine 10 is collided and the first connection terminal portion 17 is not collided. This can prevent the first connection terminal portion 17 from being damaged when the vehicle V collides from the front.

Therefore, when the vehicle V collides from the front, even when the front of the accommodation case 50 is crashed and the second rotating electric machine 20 is damaged, the step wall 523 can prevent the first rotating electric machine 10 from being damaged and can also prevent the first connection terminal portion 17 from being damaged. Thereby, the damage of the first rotating electric machine 10 can be suppressed. Therefore, since the power control unit PCU can control the first rotating electric machine 10 by preventing the first connection terminal portion 17 from being damaged, the first rotating electric machine 10 enables the vehicle V to be driven to, for example, a nearby repair shop.

Further, a predetermined distance D3 is secured between the first connection terminal portion 17 and a rear end portion 50Rr of the accommodation case 50 in the front-rear direction. Thereby, when the vehicle V collides from the front, even if the drive unit DU slides rearward, the first connection terminal portion 17 secures a predetermined distance in the front-rear direction with respect to a member arranged behind the drive unit DU. Therefore, the first connection terminal portion 17 can be prevented from being damaged.

One end of the second coil 24 of each phase of the second rotating electric machine 20 is connected to each other. The other end extends from the second stator core 23 and is connected to a second coil terminal portion 25.

The second coil terminal portion 25 is disposed above the second rotating electric machine 20 and in front of the first rotating electric machine 10 when viewed from the axial direction. The other end of the second coil 24 of each phase of the second rotating electric machine 20 extends above the second stator core 23 and is connected to the second coil terminal portion 25.

The second coil terminal portion 25 is connected to a second connection terminal portion 27 by connection wires 26 of each phase. The connection wires 26 of each phase extend upward from the second coil terminal portion 25 toward the second connection terminal portion 27 in front of the first rotating electric machine 10. The second connection terminal portion 27 is disposed above the second coil terminal portion 25, at the uppermost position in the accommodation case 50, obliquely above and forward of the rotation axis CL1 of the first rotating electric machine 10.

The second connection terminal portion 27 is connected to a second connection member (not illustrated) such as a bus bar, which is arranged at the upper portion of the accommodation case 50 and is electrically connected to a power conversion device (not illustrated) in the power control unit PCU. Thereby, the power control unit PCU can control the second rotating electric machine 20.

Hereinbefore, the embodiment of the invention is described. However, the invention is not limited to the embodiment described above and modifications, improvements, and the like can be made as appropriate.

For example, in the embodiment, the drive unit DU is arranged in the front room FR of the vehicle V, but may be arranged in the luggage room LR of the vehicle V. In this case, the second rotating electric machine 20 is disposed behind and below the first rotating electric machine 10 and can prevent the first rotating electric machine 10 from being damaged when the vehicle V collides from behind.

Further, in this case, when viewed from the axial direction, the first connection terminal portion 17 is disposed in a region further on the upper side than the lower end portion 10D of the first rotating electric machine 10 in the up-down direction and further on the front side than the rotation axis CL1 of the first rotating electric machine 10 in the front-rear direction or a region further on the upper side than the rotation axis CL1 of the first rotating electric machine 10 in the up-down direction and further on the front side than the rear end portion of the first rotating electric machine 10 in the front-rear direction. This can prevent the first connection terminal portion 17 from being damaged when the vehicle V collides from behind.

In addition, at least the following matters are described in this specification. In the parentheses, components and the like corresponding to those of the embodiment described above are shown, but the invention is not limited to this.

(1) A vehicle (vehicle V) which includes:

a first rotating electric machine (first rotating electric machine 10);

a second rotating electric machine (second rotating electric machine 20) which has a rotation axis (rotation axis CL2) parallel to a rotation axis (rotation axis CL1) of the first rotating electric machine and at least a part of which is arranged to overlap the first rotating electric machine in an axial direction;

a power transmission device (power transmission device 30) which is arranged adjacent to the first rotating electric machine in the axial direction; and an accommodation case (accommodation case 50) which has a rotating electric machine accommodation portion (rotating electric machine accommodation portion 51A) for accommodating the first rotating electric machine and the second rotating electric machine and a power transmission device accommodation portion (power transmission device accommodation portion 51B) for accommodating the power transmission device, in which the vehicle can be driven by at least the first rotating electric machine, the rotating electric machine accommodation portion and the power transmission device accommodation portion are adjacent to each other in the axial direction and are partitioned by a partition wall (partition wall 52), the partition wall includes, a first rotating electric machine accommodation wall (first rotating electric machine accommodation wall 521) which faces the first rotating electric machine in the axial direction and to which the first rotating electric machine is fixed, a second rotating electric machine accommodation wall (second rotating electric machine accommodation wall 522) which is provided further on the power transmission device side in the axial direction than the first rotating electric machine accommodation wall and faces the second rotating electric machine in the axial direction and to which the second rotating electric machine is fixed, and a step wall (step wall 523) which extends in the axial direction from the second rotating electric machine accommodation wall to the first rotating electric machine accommodation wall, the step wall is at least partially overlapped with the second rotating electric machine in the axial direction, and a distance (distance D1) between an outermost diameter portion (outermost diameter portion 20e) of the second rotating electric machine and the step wall is shorter than a distance (distance D2) between the outermost diameter portion of the second rotating electric machine and an outermost diameter portion (outermost diameter portion 10e) of the first rotating electric machine.

According to (1), the step wall of the partition wall is at least partially overlapped with the second rotating electric machine in the axial direction. Further, the distance between the outermost diameter portion of the second rotating electric machine and the step wall is shorter than the distance between the outermost diameter portion of the second rotating electric machine and the outermost diameter portion of the first rotating electric machine. Therefore, when the vehicle collides from the second rotating electric machine side, the second rotating electric machine slides toward the first rotating electric machine side, but collides with the step wall of the partition wall before the first rotating electric machine. This can prevent the first rotating electric machine from being damaged when the vehicle collides from the second rotating electric machine side.

(2) The vehicle according to (1), in which when viewed from the axial direction, the rotation axis (rotation axis CL1) of the first rotating electric machine and the rotation axis (rotation axis CL2) of the second rotating electric machine are arranged at different positions in an up-down direction (up-down direction) and an orthogonal direction (front-rear direction) orthogonal to the up-down direction, and a terminal portion (first connection terminal portion 17) connected to a coil (first coil 14) of each phase of the first rotating electric machine is located, in a region which is further on an opposite side (upper side) of the second rotating electric machine than a second rotating electric machine side end portion (lower end portion 10D) of the first rotating electric machine in the up-down direction and further on an opposite side (rear side) of the second rotating electric machine than the rotation axis (rotation axis CL1) of the first rotating electric machine in the orthogonal direction, or in a region which is further on the opposite side (upper side) of the second rotating electric machine than the rotation axis (rotation axis CL1) of the first rotating electric machine in the up-down direction and further on the opposite side (rear side) of the second rotating electric machine than the second rotating electric machine side end portion (front end portion 10Fr) of the first rotating electric machine in the orthogonal direction.

According to (2), when viewed from the axial direction, the terminal portion of the coil of each phase of the first rotating electric machine is located in the region further on the opposite side of the second rotating electric machine than the second rotating electric machine side end portion of the first rotating electric machine in the up-down direction and further on the opposite side of the second rotating electric machine than the rotation axis of the first rotating electric machine in the orthogonal direction or in the region further on the opposite side of the second rotating electric machine than the rotation axis of the first rotating electric machine in the up-down direction and further on the opposite side of the second rotating electric machine than the second rotating electric machine side end portion of the first rotating electric machine in the orthogonal direction. Therefore, when the vehicle collides from the second rotating electric machine side, it is possible to prevent the terminal portion of the coil of each phase of the first rotating electric machine from being damaged. Thus, when the vehicle collides from the second rotating electric machine side, even if the second rotating electric machine is damaged, in addition to preventing damage to the first rotating electric machine, it also prevents damage to the terminal portion connected to the coil of each phase of the first rotating electric machine. As a result, damage to the first rotating electric machine and the terminal portion can be suppressed and the vehicle can be driven by the first rotating electric machine.

(3) The vehicle according to (1) or (2), in which
when viewed from the axial direction,
the rotation axis (rotation axis CL1) of the first rotating electric machine is located on an upper side than the rotation axis (rotation axis CL2) of the second rotating electric machine,
at least parts of the first rotating electric machine and the second rotating electric machine are overlapped in the up-down direction,
the step wall has an inclined portion (inclined portion 524) which is inclined downward as it approaches the rotation axis (rotation axis CL1) of the first rotating electric machine in the orthogonal direction (front-rear direction) orthogonal to the up-down direction, and
at least a part of the inclined portion is arranged in an overlap region (overlap region S1) where the first rotating electric machine and the second rotating electric machine overlap in the up-down direction.

According to (3), when viewed from the axial direction, the rotation axis of the first rotating electric machine is located further on the upper side than the rotation axis of the second rotating electric machine and at least parts of the first rotating electric machine and the second rotating electric machine are overlapped in the up-down direction. Further, in the overlap region, there is the inclined portion which is inclined downward as it approaches the rotation axis of the first rotating electric machine in the orthogonal direction. Therefore, when the vehicle collides from the second rotating electric machine side, the second rotating electric machine slides downward along the inclined portion after colliding with the step wall. Thereby, when the vehicle collides from the second rotating electric machine side, it is possible to further suppress damage to the first rotating electric machine.

(4) The vehicle according to any one of (1) to (3), in which
when viewed from the axial direction,
at least parts of the first rotating electric machine and the second rotating electric machine are arranged so as to overlap in the orthogonal direction (front-rear direction) orthogonal to the up-down direction.

According to (4), when viewed from the axial direction, at least parts of the first rotating electric machine and the second rotating electric machine are arranged so as to overlap in the orthogonal direction. Therefore, the size of the rotating electric machine accommodation portion in the orthogonal direction can be reduced, and thus downsizing can be achieved.

(5) The vehicle according to any one of (1) to (4), in which
a drive unit (drive unit DU) including the first rotating electric machine, the second rotating electric machine, the power transmission device, and the accommodation case is arranged in a front room (front room FR) in the vehicle,
the axial direction extends in a vehicle width direction (left-right direction) of the vehicle, and
when viewed from the axial direction,
the second rotating electric machine is disposed further on a front side of the vehicle than the first rotating electric machine.

According to (5), the drive unit is arranged in the front room and the axial direction extends in the vehicle width direction of the vehicle. Further, when viewed from the axial direction, the second rotating electric machine is disposed further on the front side of the vehicle than the first rotating electric machine. Therefore, the first rotating electric machine can be prevented from being damaged when the vehicle collides from the front.

The invention claimed is:
1. A vehicle comprising:
a first rotating electric machine;
a second rotating electric machine which has a rotation axis parallel to a rotation axis of the first rotating electric machine and at least a part of which is arranged to overlap the first rotating electric machine in an axial direction;
a power transmission device which is arranged adjacent to the first rotating electric machine in the axial direction; and
an accommodation case which has a rotating electric machine accommodation portion for accommodating the first rotating electric machine and the second rotating electric machine and a power transmission device accommodation portion for accommodating the power transmission device, wherein
the vehicle can be driven by at least the first rotating electric machine,
the rotating electric machine accommodation portion and the power transmission device accommodation portion are adjacent to each other in the axial direction and are partitioned by a partition wall,
the partition wall includes:
a first rotating electric machine accommodation wall which faces the first rotating electric machine in the axial direction and to which the first rotating electric machine is fixed,
a second rotating electric machine accommodation wall which is provided further on the power transmission device side in the axial direction than the first rotating electric machine accommodation wall and faces the second rotating electric machine in the axial direction and to which the second rotating electric machine is fixed, and
a step wall which extends in the axial direction from the second rotating electric machine accommodation wall to the first rotating electric machine accommodation wall,
the step wall is at least partially overlapped with the second rotating electric machine in the axial direction, and
a distance between an outermost diameter portion of the second rotating electric machine and the step wall is shorter than a distance between the outermost diameter portion of the second rotating electric machine and an outermost diameter portion of the first rotating electric machine.

2. The vehicle according to claim 1, wherein when viewed from the axial direction, the rotation axis of the first rotating electric machine and the rotation axis of the second rotating electric machine are arranged at different positions in an up-down direction and an orthogonal direction orthogonal to the up-down direction, and a terminal portion connected to a coil of each phase of the first rotating electric machine is located, in a region which is further on an opposite side of the second rotating electric machine than a second rotating electric machine side end portion of the first rotating electric machine in the up-down direction and further on an opposite side of the second rotating electric machine than the rotation axis of the first rotating electric machine in the orthogonal direction, or in a region which is further on the opposite side of the second rotating electric machine than the rotation axis of the first rotating electric machine in the up-down direction and further on the opposite side of the second rotating electric machine than the second rotating electric machine side end portion of the first rotating electric machine in the orthogonal direction.

3. The vehicle according to claim 1, wherein when viewed from the axial direction, the rotation axis of the first rotating electric machine is located on an upper side than the rotation axis of the second rotating electric machine, at least parts of the first rotating electric machine and the second rotating electric machine are overlapped in the up-down direction, the step wall has an inclined portion which is inclined downward as it approaches the rotation axis of the first rotating electric machine in the orthogonal direction orthogonal to the up-down direction, and at least a part of the inclined portion is arranged in an overlap region where the first rotating electric machine and the second rotating electric machine overlap in the up-down direction.

4. The vehicle according to claim 1, wherein when viewed from the axial direction, at least parts of the first rotating electric machine and the second rotating electric machine are arranged so as to overlap in the orthogonal direction orthogonal to the up-down direction.

5. The vehicle according to claim 1, wherein a drive unit including the first rotating electric machine, the second rotating electric machine, the power transmission device, and the accommodation case is arranged in a front room in the vehicle, the axial direction extends in a vehicle width direction of the vehicle, and when viewed from the axial direction, the second rotating electric machine is disposed further on a front side of the vehicle than the first rotating electric machine.

\* \* \* \* \*